US008340428B2

United States Patent
Perronnin et al.

(10) Patent No.: US 8,340,428 B2
(45) Date of Patent: Dec. 25, 2012

(54) UNSUPERVISED WRITER STYLE ADAPTATION FOR HANDWRITTEN WORD SPOTTING

(75) Inventors: Florent C. Perronnin, St. Martin d'Heres (FR); Jose A. Rodriguez Serrano, Barcelona (ES)

(73) Assignee: Xerox Corporation, Norwalk, CT (US)

( * ) Notice: Subject to any disclaimer, the term of this patent is extended or adjusted under 35 U.S.C. 154(b) by 1302 days.

(21) Appl. No.: 12/061,070

(22) Filed: Apr. 2, 2008

(65) Prior Publication Data

US 2009/0252417 A1 Oct. 8, 2009

(51) Int. Cl.
 *G06K 9/00* (2006.01)
(52) U.S. Cl. .......................................... 382/187; 382/186
(58) Field of Classification Search ........................ None
See application file for complete search history.

(56) References Cited

U.S. PATENT DOCUMENTS

| | | | |
|---|---|---|---|
| 5,438,630 A * | 8/1995 | Chen et al. ..................... 382/159 |
| 5,745,600 A | 4/1998 | Chen et al. |
| 5,825,919 A | 10/1998 | Bloomberg et al. |
| 5,841,902 A | 11/1998 | Tu |
| 6,108,444 A | 8/2000 | Syeda-Mahmood |
| 6,256,410 B1 | 7/2001 | Nathan et al. |
| 6,356,655 B1 | 3/2002 | Sumikawa et al. |
| 6,453,054 B1 | 9/2002 | Caesar et al. |
| 6,917,708 B2 | 7/2005 | Goodman et al. |
| 6,985,859 B2 | 1/2006 | Morin |
| 7,020,338 B1 | 3/2006 | Cumbee |
| 7,099,507 B2 | 8/2006 | Ouchi |
| 7,266,236 B2 | 9/2007 | Hickerson et al. |
| 2007/0154071 A1 | 7/2007 | Lin et al. |

OTHER PUBLICATIONS

Woodland, "Speaker Adaptation: Techniques and Challenges," ASRU, vol. 1, pp. 85-90 (1999).

U.S. Appl. No. 12/014,193, filed Jan. 15, 2008, Serrano et al.
U.S. Appl. No. 11/847,742, filed Aug. 30, 2007, Bressan, et al.
Bunke, H. 2003. Recognition of Cursive Roman Handwriting—Past, Present and Future. *Proceeding of the Seventh International Conference on Document Analysis and Recognition (ICDAR* 2003).
Lowe, D. G. ISSN 0920-5691. 2004. Distinctive Image Features from Scale-Invariant Keypoints. *Int.J.Comput.Vision.* 60(2), pp. 91-110.
Madhvanath, S. and V. Govindaraju. 2001. The Role of Holistic Paradigms in Handwritten Word Recognition. *IEEE Transactions on Pattern Analysis and Machine Intelligence.* 23(2). pp. 149-164.
Marti, U. and H. Bunke. ISSN 981-02-4564-5. 2002. Using a Statistical Language Model to Improve the Performance of an HMM-Based Cursive Handwriting Recognition System. *International Journal of Pattern Recognition and Artificial Intelligence.* pp. 65-90.
Martin, A., et al. 1997. *The DET Curve in Assessment of Detection Task Performance.* pp. 1895-1898.
Rath, T. M. and R. Manmatha. ISSN 0-7695-1960-1. 2003. *Features for Word Spotting in Historical Manuscripts.* pp. 218.

(Continued)

*Primary Examiner* — Chan S Park
*Assistant Examiner* — Elisa Rice
(74) *Attorney, Agent, or Firm* — Fay Sharpe LLP

(57) ABSTRACT

A word spotting system includes a semi-continuous hidden Markov model configured to model a handwritten word of interest. A writing segments extractor is configured to extract writing segments generally comprising images of handwritten character strings from a received document image. A word model adaptation processor is configured to adjust a shared pool of Gaussians of the semi-continuous hidden Markov model respective to the extracted writing segments. A modeler is configured to model extracted writing segments using the semi-continuous hidden Markov model with the adjusted shared pool of Gaussians to identify whether each modeled writing segment matches the handwritten word of interest.

22 Claims, 2 Drawing Sheets

OTHER PUBLICATIONS

Vinciarelli, A., S. Bengio, and H. Bunke. 2004. Offline Recognition of Unconstrained Handwritten Texts using HMMs and Statistical Language Models. *IEEE Transactions on Pattern Analysis and Machine Intelligence.* 26(6), pp. 709-720.

Zhang, B. and S. N. Srihari. 2003. *Binary Vector Dissimilarity Measures for Handwriting Identification.* pp. 28-38.

Rabiner, L.R., and B.H. Juang, An Introduction to Hidden Markov Models, *IEEE ASSP Magazine*, 1986.

Spitz. L.A., Using Character Shape Codes for Word Spotting in Document Images, *In Shape, Structure, and Pattern Recognition*, World Scientific, Singapore, 1995.

\* cited by examiner

UNSUPERVISED WRITER STYLE ADAPTATION FOR HANDWRITTEN WORD SPOTTING

BACKGROUND

The following relates to the document processing and related arts.

Document images are sometimes generated in digital image format through the use of optical scanners that create pixel map representations of document pages, or the like. Such document images are challenging to process since the information content is not readily extracted from the pixel maps. In the case of document images generated from typed document pages it is known to employ optical character recognition (OCR) to identify characters (e.g., letters, numerals, punctuation, or the like) and strings of characters. OCR processing is facilitated by the general standardization and uniformity of type fonts.

Document images generated from handwritten documents (including documents containing handwritten portions) are more challenging, due to substantial person-to-person variations in writing style, and even some variation in writing style by a single writer. Handwriting recognition is a process analogous to OCR, in which individual handwritten characters are recognized. Handwriting recognition optionally includes pre-processing such as normalization of slant, skew, aspect ratio, or other variations of handwritten characters. Handwriting recognition has found application in processing of optically scanned document images, as well as in other applications such as electronic tablets or tablet computers having a touch-sensitive pad or screen on which text can be handwritten using a suitable stylus.

Since the handwriting recognition system outputs strings of characters (for example, in ASCII format) it is straightforward to identify any word of interest by searching for the corresponding character string. However, the character-based approach does not readily take into account connectors between characters or identifying aspects of character groupings. It is known to extend the character-based approach by modeling certain commonly occurring character groupings as described for example in U.S. Pat. No. 7,266,236. Handwriting recognition is also computationally intensive as each character on the page image is individually processed and converted to ASCII or another character representation.

Word spotting applications have a modest objective of identifying whether a particular word or phrase occurs in an image of a handwritten (or partially handwritten) document and, optionally, of locating said word or phrase. A typical word spotting application is intended to have high throughput, and serves as a categorizer to categorize each input document as either containing the word or interest or not. Handwriting recognition can in principle be used for word spotting, but its computational intensiveness can adversely affect word spotting throughput. Instead, word spotting typically employs faster pattern recognition or whole-word modeling in which a classifier is trained to match a characteristic pattern or word model using training images of the word of interest. Such algorithms are computationally efficient compared with handwriting recognition, and word-level pattern recognition or modeling can utilize connectors and character groupings throughout the handwritten word of interest in performing the matching.

By accounting for person-to-person variations in handwriting recognition and word spotting applications, the accuracy of the handwriting recognition or word spotting is expected to improve. U.S. Pat. No. 6,256,410 discloses an approach for adapting handwriting recognition for an individual writer. A first pass is performed using a universal handwritten characters model, which enables most handwritten characters in the document to be correctly identified. The universal handwritten characters model is then iteratively refined using the initially recognized handwritten characters as a database to improve the recognition accuracy.

Unfortunately, the writer-adaptation approach of U.S. Pat. No. 6,256,410 is not readily adapted to word spotting applications. There are usually few or no occurrences of the handwritten word of interest in any given document, and since word spotting is performed on a per-word basis rather than on a per-character basis, this means that a first pass will typically provide zero, one, or at most a few candidate word pattern matches. This small or non-existent population of samples is insufficient for performing the iterative refinement operation.

INCORPORATION BY REFERENCE

Jose A. Rodriguez Serrano et al., U.S. application Ser. No. 11/847,757 filed Aug. 30, 2007 and entitled "System and Method for Characterizing Handwritten or Typed Words in a Document" is incorporated herein by reference in its entirety. This application discloses at least a method of characterizing a word image that includes traversing the word image stepwise with a window to provide a plurality of window images. For each of the plurality of window images, the method includes splitting the window image to provide a plurality of cells. A feature, such as a gradient direction histogram, is extracted from each of the plurality of cells. The word image can then be characterized based on the features extracted from the plurality of window images.

Jose A. Rodriguez Serrano et al., U.S. application Ser. No. 12/014,193 filed Jan. 15, 2008 and entitled "Asymmetric Score Normalization for Handwritten Word Spotting System" is incorporated herein by reference in its entirety. This application discloses at least a method that begins by receiving an image of a handwritten item. The method performs a word segmentation process on the image to produce a sub-image and extracts a set of feature vectors from the sub-image. Then, the method performs an asymmetric approach that computes a first log-likelihood score of the feature vectors using a word model having a first structure (such as one comprising a Hidden Markov Model (HMM)) and also computes a second log-likelihood score of the feature vectors using a background model having a second structure (such as one comprising a Gaussian Mixture Model (GMM)). The method computes a final score for the sub-image by subtracting the second log-likelihood score from the first log-likelihood score. The final score is then compared against a predetermined standard to produce a word identification result and the word identification result is output.

BRIEF DESCRIPTION

In some illustrative embodiments disclosed as illustrative examples herein, a word spotting method is disclosed, comprising: defining a word model having first parameters and second parameters; extracting writing segments generally comprising images of handwritten character strings from a received document image; adjusting the first parameters of the word model respective to the extracted writing segments without adjusting the second parameters of the word model; and performing word spotting on the received document image using the word model with the adjusted first parameters and the unadjusted second parameters to identify whether a handwritten word of interest is present in the received document image.

In some illustrative embodiments disclosed as illustrative examples herein, a word spotting system is disclosed, comprising: a semi-continuous hidden Markov model configured to model a handwritten word of interest; a writing segments extractor configured to extract writing segments generally comprising images of handwritten character strings from a received document image; a word model adaptation processor configured to adjust a shared pool of Gaussians of the semi-continuous hidden Markov model respective to the extracted writing segments; and a modeler configured to model extracted writing segments using the semi-continuous hidden Markov model with the adjusted shared pool of Gaussians to identify whether each modeled writing segment matches the handwritten word of interest.

In some illustrative embodiments disclosed as illustrative examples herein, a storage medium stores instructions executable to perform a word spotting method including (i) extracting writing segments generally comprising images of handwritten character strings from a received document image (ii) adjusting some but not all parameters of a word model respective to the extracted writing segments and (iii) comparing the adjusted word model with extracted writing segments to identify whether a handwritten word of interest is present in the received document image.

DETAILED DESCRIPTION

Figure 1:
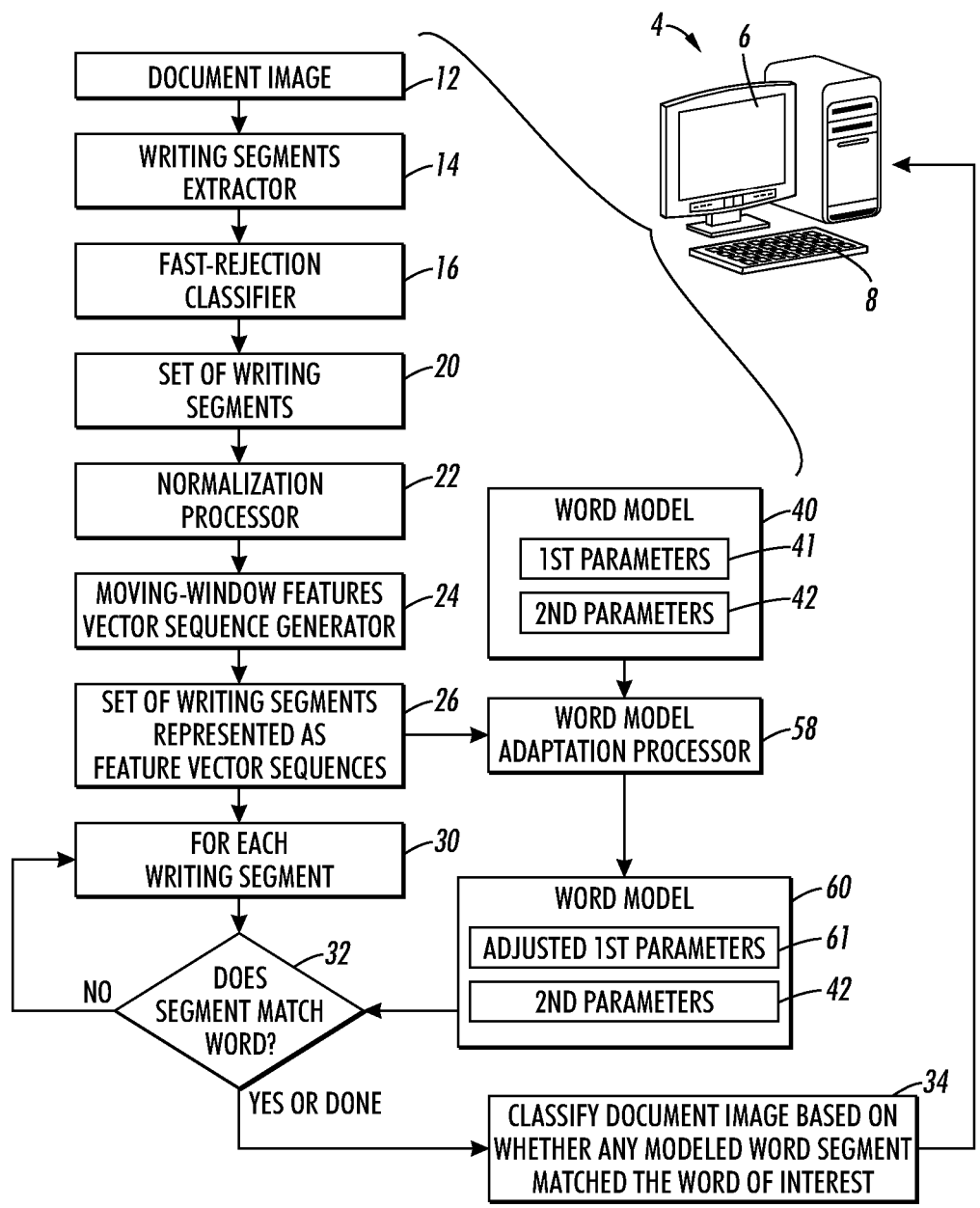
FIG. 1 diagrammatically shows a word spotting system that adapts in an unsupervised fashion to the handwriting style of a particular document image.

With reference to FIG. 1, a word spotting system is illustrated. The word spotting system illustrated as an example is embodied as a computer 4 with a display 6 and a keyboard 8, mouse, or other user input device or plurality of user input devices, said computer 4 being programmed to perform a word spotting method shown by a diagrammatic block diagram in FIG. 1. Instead of the illustrated computer 4, the word spotting system can be embodied as an Internet server accessed by a suitable Internet-capable device, a handheld digital device such as a personal data assistant (PDA), a mainframe computer, a laptop computer, or so forth. It is also contemplated for some portions of the word spotting system to be embodied by analog circuitry, application specific integrated circuitry (ASIC), or so forth. The word spotting system can also be embodied as a storage medium storing instructions executable on the computer 4 or on another digital processor to perform the word spotting method. Such a storage medium may be, for example, a magnetic disk, an optical disk, a read-only memory (ROM), a random access memory (RAM), an Internet server storage medium, or so forth.

The word spotting system receives a document image 12, for example generated by an optical scanner or the like. The document image 12 includes, or is expected to possibly include, at least some handwritten content, and it is desired to determine whether a handwritten word of interest is contained in the document. Toward this end, a writing segments extractor 14 processes the document image 12 to identify sub-images, called writing segments herein, that are expected to be images of handwritten words, handwritten numbers, or so forth. The writing segments extractor 14 can use any suitable criterion or characteristics for delineating writing segments, such as those used in handwriting recognition techniques. The writing segments generally comprise images of handwritten character strings, such as images of handwritten words, handwritten numerical quantities, or so forth. The modifier "generally comprising" recognizes that in some instances a writing segment may comprise an image of a single handwritten character, or may comprise an image of something other than handwritten text, or so forth. For example, if spaces are identified to delineate writing segments, then a writing segment corresponding to a single-letter handwritten word such as a handwritten "a" may be an image of a single handwritten character—however, it is expected that most writing segments will be images of character strings each including a plurality of characters. Similarly, in some instances the writing segments extractor 14 may incorrectly extract an image of something other than handwritten text, such as an image of a logo, an image of boldfaced large-font typed text, or so forth—again, this is not expected to be the case for most extracted writing segments.

Optionally, the writing segments are refined or filtered by further processing. In the illustrated embodiment, a fast rejection classifier 16 serves as a filter to remove most writing segments that manifestly do not match the handwritten word of interest. The fast rejection classifier 16 should produce a low rate of false rejections since any writing segment that is falsely rejected is not passed on to downstream processing and hence is irrevocably lost. On the other hand, the fast rejection classifier 16 can have a relatively high rate of false positives since any false positive is passed downstream where it is likely to be recognized as not corresponding to the handwritten word of interest. The fast rejection classifier 16 may be configured to reject writing segments based on global features such as the aspect ratio, the width of the extracted writing segment, an image contrast measure, or so forth, such global features being fast to compute and configurable (for example, by setting a suitable filtering threshold) to produce a low false rejection rate. The output of the fast rejection classifier 16 is a set of writing segments 20.

The writing segments 20 are then pre-processed to generate representations amenable to the word spotting processing. In the illustrated embodiment, a normalization processor 22 performs normalization pre-processing of those extracted writing segments 20 not rejected by the fast-rejection classifier 16. Such normalization pre-processing may include, for example, normalizing one or more of the slant, skew, text height, and aspect ratio of the handwritten content of the writing segments.

The writing segments 20 after optional normalization pre-processing are further optionally converted, transformed, or otherwise manipulated into a form more suitable for word spotting processing. In the illustrated embodiment, a moving window features vector sequence generator 24 traverses the writing segment stepwise with a moving window to provide a plurality of window images, and a features vector is generated for each window image to generate the sequence of feature vectors. For example, in the approach of U.S. application Ser. No. 11/847,757 filed Aug. 30, 2007 which is incorporated herein by reference in its entirety, each of the plurality of window images is split to provide a plurality of cells, and one or more features, such as a gradient direction histogram, is extracted from each of the plurality of cells. The output of the moving window features vector sequence generator 24 is a set of writing segments represented as features vector sequences 26.

Word spotting is performed on the received document image 12 by modeling the extracted and optionally pre-processed writing segments 26 using a word model to identify whether the handwritten word of interest is present in the received document image. An iterative looping process 30, 32 is applied to each writing segment, in which the writing segment is compared by a comparator 32 with the word model of the handwritten word of interest to determine whether the writing segment corresponds to the handwritten word of interest. The iterative looping process 30, 32 is applied until either (i) a writing segment matches the handwritten word of interest as indicated by the word model or (ii) all of the writing segments 26 are processed without finding such a match. Alternatively, the iterative looping process 30, 32 can be applied until the set of writing segments 26 is exhausted, so as to provide a numerical count (which may be zero, one, or some number greater than one) of the number of occurrences of the handwritten word of interest. A classifier 34 classifies the received document image 12 as either containing the handwritten word of interest or not based on whether any modeled word segment matched the handwritten word of interest. A user interface, such as the illustrated computer 4, optionally displays an indication of whether the received document image 12 includes the handwritten word of interest or its specific location based on the output of the modeler 30, 32. For example, the user interface optionally displays the document image 12 on the display 6 if it includes the handwritten word of interest, or optionally prints the document image 12 if it includes the handwritten word of interest, or optionally lists a name or other identifier of the document image on a displayed list of document images if it includes the handwritten word of interest, or so forth.

The word model used by the modeler 30, 32 is a parameterized model having first parameters and second parameters. Unlike in character-based handwriting recognition systems, the word model is respective to an entire handwritten word of interest, rather than respective to individual characters or character groups of the handwritten word of interest. Further, the word model used by the modeler 30, 32 is parameterized. Preferably, the first parameters principally characterize word parts and the second parameters principally characterize combinations of word parts, although it is to be understood that this delineation is not strictly rigid. In the illustrative embodiments described herein, the word model is a semi-continuous hidden Markov model, the first parameters are parameters of a shared pool of Gaussians of the semi-continuous hidden Markov model, and the second parameters are mixture weights of the semi-continuous hidden Markov model. In the notation used herein, the parameters of the shared pool of Gaussians of the semi-continuous hidden Markov model include mean and covariance parameters of the Gaussians, although other parameters representing the "center" and "width" or other statistical characteristics of the Gaussians are also contemplated.

In a semi-continuous hidden Markov model, the emission probability of each state is modeled as a mixture of K shared Gaussians densities $\{p_1, \ldots, p_K\}$. Let $p_{n,s}$ denote the emission probability in state s of a handwritten word of interest $w_n$. This emission probability $p_{n,s}$ can be written as:

$$p_{n,s}(x) = \sum_{k=1}^{K} \omega_{n,s,k} p_k(x), \quad (1)$$

where each $p_k(X)$ represents a Gaussian of the pool of Gaussians. The pool of Gaussians (that is, Gaussian functions) should be large enough (that is, the parameter K should be large enough) to achieve sufficient precision. For example, in some embodiments K=512 is used.

For this semi-continuous hidden Markov model embodiment of the word model, the first parameters are the parameters of the Gaussians $p_k(x)$, suitably represented for example by means $\mu_k$ and covariances $\Sigma_k$, while the second parameters are the mixture weights $\mu_{n,s,k}$. It will be noted that the first parameters $\mu_k, \Sigma_k$ are independent of the handwritten word of interest $w_n$ (as indicated by the lack of dependence upon the word index n for these first parameters) whereas the mixture weights $\omega_{n,s,k}$ do depend on the handwritten word of interest $w_n$ (as indicated by the dependence of these second parameters on the word index n). The means $\mu_k$ and covariances $\Sigma_k$ of the semi-continuous hidden Markov model (that is, the parameters of the shared pool of Gaussians) model the basic shapes encoded by the feature vectors, such as characters, parts of characters, connectors between characters, or so forth. Each state models a word part, and so the mixture weights $\omega_{n,s,k}$ of a given state s model which basic shapes best describe the corresponding word part.

It is recognized herein that the basic shapes are generally writer-dependent, as for example different writers form the cursive handwritten letter "e" in different ways. Thus, the first parameters corresponding to parameters of the shared pool of Gaussians are expected to be writer dependent. Moreover, the basic shapes are expected to be word-independent, in that for example a given writer typically forms all cursive handwritten letters "e" in about the same way, regardless of in which word the letter "e" occurs. It follows that the first parameters corresponding to parameters of the shared pool of Gaussians should be substantially uniform across a given document image 12, but should vary from document image to document image depending upon the writer's identity or handwriting style.

It is further recognized herein that the second parameters of the semi-continuous hidden Markov model comprising the mixture weights are generally word-dependent but writer-independent. This is because the mixture weights define the shapes combining to form a word part, and this combination should be about the same for a given handwritten word of interest regardless of the writer's identity or handwriting style.

In view of this, the word spotting system of FIG. 1 is configured to adapt the pool of Gaussians of a "universal" or unadapted semi-continuous hidden Markov model (that is, the first parameters) to the handwriting style of the document image 12 in an unsupervised manner. The mixture weights (that is, the second parameters), however, remain unadapted. Hence, for a given word, a different adapted word model is obtained for each processed document image 12.

Notation used herein for describing illustrative examples is as follows. Denote by $p_{i,k}$ the probability density of Gaussian k in the pool of Gaussians adapted to a document image $L_i$ (with mean vector $\mu_{i,k}$ and covariance matrix $\Sigma_{i,k}$). Denote by $p_{i,n,s}$ the emission probability in state s of word $w_n$ for letter $L_i$. Then the following holds:

$$p_{i,n,s}(x) = \sum_{k=1}^{K} \omega_{n,s,k} p_{i,k}(x). \quad (2)$$

Denote by $\lambda_n$ the set of second parameters of the word model $w_n$ which are word-dependent but writer-independent. For the illustrative example of a semi-continuous hidden Markov model these are the mixture weight parameters $\omega_{n,s,k}$. Similarly, denote by $\theta_i$ the set of first parameters of the word model which are writer-dependent (or, more generally, document image-dependent). For the illustrative example of a semi-continuous hidden Markov model these are the parameters of the shared pool of Gaussians of the semi-continuous hidden Markov model, that is, the means $\mu_{i,k}$ and covariances $\Sigma_{i,k}$ for the illustrative notation being used herein. The sequence of feature vectors extracted from the writing segment corresponding to handwritten word $w_n$ in document image $L_i$ is denoted as $X_{i,n}$.

Figure 2:
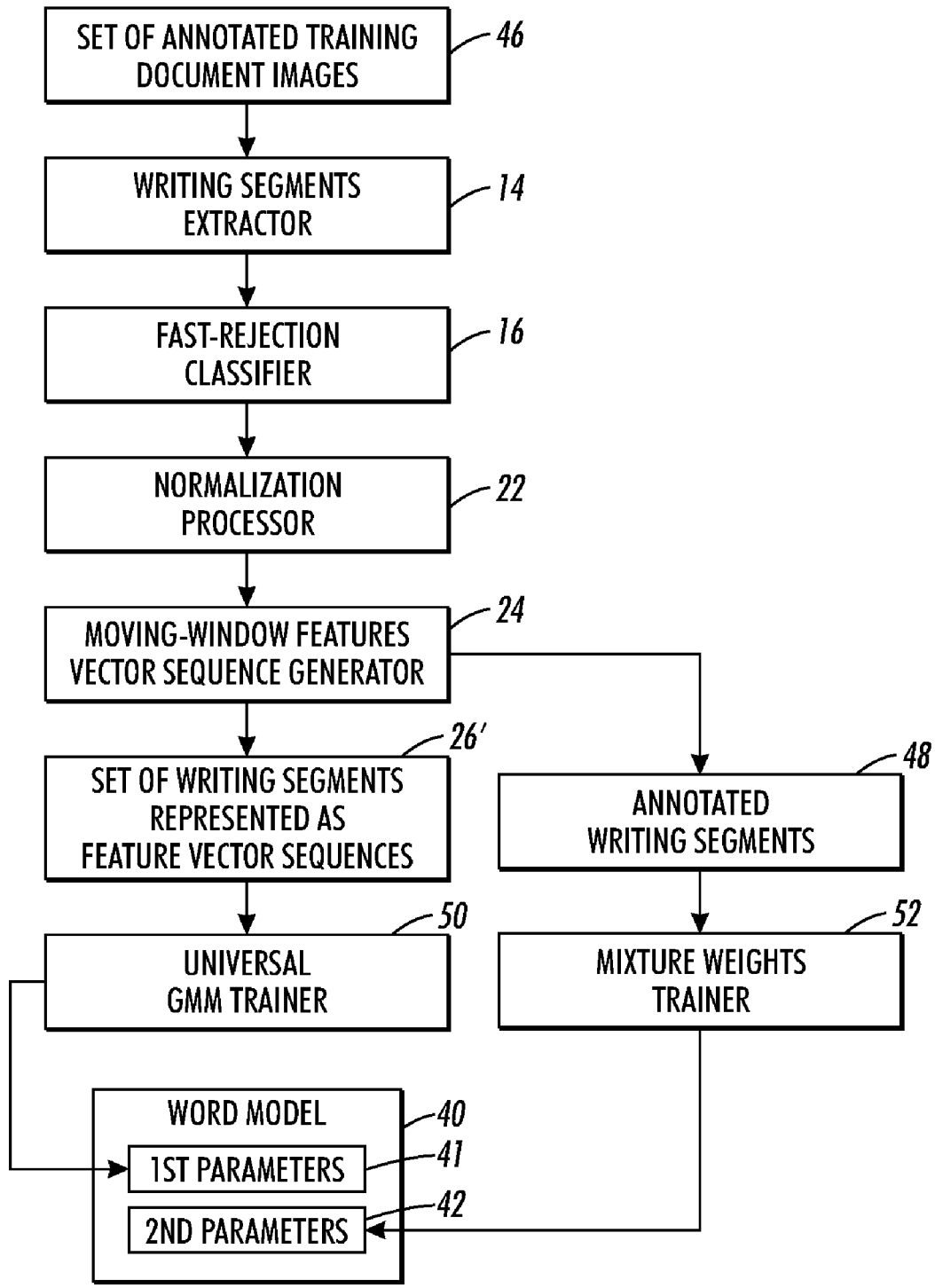
FIG. 2 diagrammatically shows a sub-system for constructing a universal word model that is adapted in an unsupervised fashion to the handwriting style of a particular document image.

With reference to FIG. 1 and with further reference to FIG. 2, an unadapted word model 40 is generated as follows. The unadapted word model 40 includes first parameters $\theta_i$ 41 corresponding in the illustrative embodiments to the parameters of the pool of Gaussians of a semi-continuous hidden Markov model, and second parameters $\lambda_n$ 42 corresponding in the illustrative embodiments to the mixture parameters of the semi-continuous hidden Markov model. FIG. 2 diagrammatically shows a builder for constructing the unadapted word model 40. A set of annotated document images 46 include a plurality of instances of the handwritten word of interest, each instance being indicated by an annotation or other identifier. The set of annotated document images 46 are preferably derived from a number of different writers having a range of different writing styles, so as to be representative of the range of writing styles likely to be encountered by the word spotting system. The set of annotated document images 46 are processed by the writing segments extractor 14, optional fast-rejection filter 16, optional normalization processor 22, and optional moving window features vector sequence generator 24 to generate a set of writing segments represented as features vector sequences 26'. The set of writing segments 26' of FIG. 2 is differentiated from the set of writing segments 26 of FIG. 1 because of the different source, i.e. the document image 12 in FIG. 1 compared with the set of annotated document images 46 in FIG. 2. Additionally, annotated writing segments 48 corresponding to the handwritten word of interest are identified a priori based on the annotations of the set of annotated document images 46.

A universal Gaussian mixture model (GMM) trainer 50 trains a universal Gaussian mixture model (GMM) on the relatively large set of writing segments 26' containing a substantial number of words and various writing styles. This GMM is therefore configured to model all the basic shapes which may be encountered. In some embodiments, the GMM trainer 50 operates on all the writing segments 26', and not only those writing segments 48 annotated as being the handwritten word of interest. The GMM trainer 50 can employ substantially any known algorithm for adapting the Gaussians of the GMM to the data 26', such as Maximum a Posteriori (MAP), Maximum Likelihood Linear Regression (MLLR), Constrained Maximum Likelihood Linear Regression (CMLLR), Eigenvoices or Cluster-Adaptive Training (CAT). The output of the GMM trainer 50 is a GMM that corresponds to the pool of Gaussians 41 of the unadapted semi-continuous hidden Markov model representing the handwritten word of interest.

A mixture weights trainer 52 operates on only those annotated writing segments 48 corresponding to the handwritten words of interest to provide values for the second parameters 42 for the handwritten word of interest. In some embodiments, the mixture weights trainer 52 keeps the first parameters 41 fixed at the values determined by the GMM trainer 50, and optimizes only the mixture weighting parameters 42. The mixture weights trainer 52 can also use various known techniques for optimizing the mixture weights, such as by maximizing the log-likelihood function $\Sigma_i \log p(X_{i,n}|\lambda_n,\theta_i)$ with respect to the set of second parameters $\lambda_n$ for the annotated writing segments 48. This log-likelihood function formulation assumes for simplicity that each training document image has a single instance of the handwritten word of interest. Some further examples of generating a "universal" or unadapted word model (that is, a word model not adapted for any particular handwriting style) are given in U.S. application Ser. No. 12/014,193 filed Jan. 15, 2008 which is incorporated herein by reference. It will also be appreciated that if there is more than one handwritten word of interest, the same Gaussian pool parameters 41 can be used for each word model, and only the mixture weight parameters 42 are customized by the mixture weights trainer 52 to construct different models for each handwritten word of interest.

With particular reference back to FIG. 1, the universal or unadapted word model 40 is adapted to the writing style of the document image 12 under processing by a word model adaptation processor 58 to generate an adapted word model 60 including adapted or adjusted first parameters 61 and unadapted second parameters 42. The word model adaptation processor 58 makes use of the observation that the first parameters are substantially dependent upon individual handwriting style, whereas the second parameters are not. Moreover, since it is further observed herein that the first parameters are substantially word-independent, the word model adaptation processor 58 advantageously makes use of the entire set of writing segments 26 reflecting the handwriting style of the document image 12, regardless of whether a given writing segment is one of the handwritten words of interest. Thus, the word model adaptation processor 58 adapts the universal GMM generated by the universal GMM trainer 50 (see FIG. 2) using all the data available in document image L 12. In one approach, the comparator 32 then scores a given writing segment by computing the likelihood ratio of the adjusted word model 60 over a background model such as the universal GMM corresponding to the adjusted first parameters 41 or another suitable reference.

Although the word spotting system is described with reference to processing the single document image 12 to spot a single handwritten word of interest, it will be appreciated that the word spotting system can be applied to a plurality of document images to spot one or more handwritten words of interest in each document image, if present. To spot a plurality of handwritten words of interest in a single document image, one can apply the modeler 30, 32 a plurality of times using a suitable word model for each word of interest. To spot one or more handwritten words of interest in a plurality of document images, one can suitably input each document image in succession to the writing segments extractor 14.

An embodiment of a word spotting system constructed in accordance with the teachings herein was applied to a database consisting of real scanned letters. Because the database was made up of letters written by a variety of different human writers, it included a variability of writers, styles, artifacts and other anomalies such as spelling mistakes. Pre-processing segmentation processes were carried out on 630 of such letters to obtain a set of word image hypotheses. The ten most frequent words were extracted from these letters. Training and test is carried out using N-fold cross validation with N=5 folds. This means that the letters were divided into 5 equal-sized randomly generated sets (the folds). The samples from 4 of the folds were used for training and the remaining set was used for testing. From this set of words 128 local histogram features were extracted (although experiments with other features have been performed and demonstrated generality of the word spotting approach). For both the Gaussian pool of the semi-continuous hidden Markov model and for the background GMM, 512 Gaussians were used. One semi-continuous hidden Markov model with ten states per letter was trained for each handwritten word of interest. Given a handwritten word of interest to detect, each of the testing samples can be assigned to either a positive or to a negative class. It is positive if the test sample has the same identity as the handwritten word of interest, and it is negative otherwise. The semi-continuous hidden Markov model associates a score to each training sample (that is, each extracted writing segment) depending on how likely it is to be the handwritten word of interest. The threshold for making the decision is application-dependent. For evaluation purposes, different thresholds were tried and errors were classified in terms of false rejection FR (positive samples with a score below the threshold) and false acceptance FA (negative samples with scores above the threshold). A way of characterizing the performance of the system is to plot FR versus FA as the threshold evolves. One observes that there is a tradeoff between FR and FA. For word spotting, it is more important to avoid false negatives than to miss correct words, so that a reasonable FR rate was set and performance evaluated in terms of the lowest FA rates. It was found that both the average precision and false acceptance rate (for a false rejection rate of 40%) for spotting of most handwritten words of interest was improved using the disclosed writer-adaptive approach.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A word spotting method comprising:
defining a word model having first parameters and second parameters;
extracting writing segments generally comprising images of handwritten character strings from a received document image;
adjusting the first parameters of the word model respective to the extracted writing segments without adjusting the second parameters of the word model; and
performing word spotting on the received document image using the word model with the adjusted first parameters and the unadjusted second parameters to identify whether a handwritten word of interest is present in the received document image;
wherein at least the extracting, the adjusting, and the performing of word spotting are performed by a computer.

2. The word spotting method as set forth in claim 1, wherein the word model is a semi-continuous hidden Markov model, the first parameters are parameters of a shared pool of Gaussians of the semi-continuous hidden Markov model, and the second parameters are mixture weights of the semi-continuous hidden Markov model.

3. The word spotting method as set forth in claim 2, wherein the first parameters are mean and covariance parameters of the shared pool of Gaussians of the semi-continuous hidden Markov model.

4. The word spotting method as set forth in claim 2, wherein the performing is repeated for a plurality of different handwritten words of interest to identify whether each handwritten word of interest is present in the received document image.

5. The word spotting method as set o h in claim 2, wherein the word spotting comprises:

modeling extracted writing segments using the semi-continuous hidden Markov model with the adjusted first parameters and the unadjusted second parameters to identify whether each modeled writing segment matches the handwritten word of interest, wherein the handwritten word of interest comprises a string of a plurality of characters.

6. The word spotting method as set forth in claim 5, further comprising:
computing a sequence of features vectors for each modeled writing segment, the modeling being respective to the computed sequences of features vectors;
wherein the computing is performed by the computer.

7. The word spotting method as set forth in claim 1, further comprising:
printing or displaying the received document image conditional upon the word spotting indicating that the handwritten word of interest is present in the received document image.

8. The word spotting method as set forth in claim 1, wherein the word spotting comprises:
modeling extracted writing segments using the word model with the adjusted first parameters and the unadjusted second parameters to identify whether each modeled writing segment matches the handwritten word of interest, wherein the handwritten word of interest comprises a string of a plurality of characters.

9. The word spotting method as set forth in claim 8, wherein the first parameters principally characterize word parts and the second parameters principally characterize combinations of word parts.

10. The word spotting method as set forth in claim 8, further comprising:
computing a sequence of features vectors for each modeled writing segment, the modeling being respective to the computed sequences of features vectors;
wherein the computing is performed by the computer.

11. The word spotting method as set forth in claim 1, further comprising:
performing a fast-rejection classification of the extracted writing segments prior to performing word spotting.

12. A word spotting system comprising:
a semi-continuous hidden Markov model configured to model a handwritten word of interest;
a writing segments extractor configured to extract writing segments generally comprising images of handwritten character strings from a received document image;
a word model adaptation processor configured to adjust a shared pool of Gaussians of the semi-continuous hidden Markov model respective to the extracted writing segments; and
a modeler configured to model extracted writing segments using the semi-continuous hidden Markov model with the adjusted shared pool of Gaussians to identify whether each modeled writing segment matches the handwritten word of interest.

13. The word spotting system as set forth in claim 12, wherein the word model adaptation processor does not adjust mixture weight parameters of the semi-continuous hidden Markov model.

14. The word spotting system as set forth in claim 12, wherein the word model adaptation processor is configured to adjust mean and covariance parameters of the shared pool of Gaussians of the semi-continuous hidden Markov model respective to the extracted writing segments.

15. The word spotting system as set forth in claim 12, further comprising:

a user interface configured to display an indication of whether the received document image includes the handwritten word of interest based on the output of the modeler.

16. The word spotting system as set forth in claim 12, further comprising:
a moving window features vector generator configured to compute a sequence of features vectors for each modeled writing segment, the modeler being configured to model the sequence of features vectors using the semi-continuous hidden Markov model with the adjusted shared pool of Gaussians.

17. A non-transitory storage medium storing instructions readable and executable by a computer to perform a word spotting method including (i) extracting writing segments generally comprising images of handwritten character strings from a received document image (ii) adjusting some but not all parameters of a word model respective to the extracted writing segments and (iii) comparing the adjusted word model with extracted writing segments to identify whether a handwritten word of interest is present in the received document image.

18. The non-transitory storage medium as set forth in claim 17, wherein parameters characterizing word parts are adjusted by the adjusting while parameters characterizing combinations of word parts are not adjusted by the adjusting.

19. The non-transitory storage medium as set forth in claim 18, wherein the word model is a semi-continuous hidden Markov model, the parameters characterizing word parts are parameters of a shared pool of Gaussians of the semi-continuous hidden Markov model, and the parameters characterizing combinations of word parts are mixture weights of the semi-continuous hidden Markov model.

20. The non-transitory storage medium as set forth in claim 19, wherein the word spotting method further includes computing a sequence of features vectors for each modeled writing segment, the comparing including comparing the computed sequences of features vectors with the adjusted word model.

21. The non-transitory storage medium as set forth in claim 19, wherein the word spotting method further includes printing or displaying the received document image or an indication thereof conditional upon the word spotting indicating that the handwritten word of interest is present in the received document image.

22. The word spotting method as set forth in claim 1, further comprising:
prior to performing the word spotting, performing normalization pre-processing of those extracted writing segments not rejected by the fast-rejection classification, said normalization pre-processing including normalizing at least one of slant, skew, text height, and aspect ratio, the normalization pre-processing being performed by the computer.

\* \* \* \* \*